(12) United States Patent
Cao

(10) Patent No.: US 11,048,130 B1
(45) Date of Patent: Jun. 29, 2021

(54) DISPLAY PANEL

(71) Applicant: Shenzhen China Star Optoelectronics Semiconductor Display Technology Co., Ltd., Guangdong (CN)

(72) Inventor: Wu Cao, Guangdong (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 0 days.

(21) Appl. No.: 16/650,394

(22) PCT Filed: Mar. 16, 2020

(86) PCT No.: PCT/CN2020/079446
§ 371 (c)(1),
(2) Date: Mar. 25, 2020

(30) Foreign Application Priority Data

Feb. 28, 2020 (CN) .......................... 202010127452.1

(51) Int. Cl.
*G02F 1/1362* (2006.01)
*G09G 3/36* (2006.01)

(52) U.S. Cl.
CPC ..... *G02F 1/136286* (2013.01); *G09G 3/3674* (2013.01); *G09G 3/3685* (2013.01); *G09G 2300/0426* (2013.01)

(58) Field of Classification Search
CPC ............ G02F 1/136286; G09G 3/3674; G09G 3/3685; G09G 2300/0426
USPC ........................................................ 349/146
See application file for complete search history.

(56) References Cited

U.S. PATENT DOCUMENTS

| 2008/0084529 | A1* | 4/2008 | Wang .................... G02F 1/1395 349/146 |
| 2013/0128176 | A1 | 5/2013 | Hirosawa |
| 2014/0036179 | A1 | 2/2014 | Huang et al. |
| 2014/0160417 | A1* | 6/2014 | Morita ............. G02F 1/134363 349/139 |
| 2016/0056177 | A1 | 2/2016 | Li et al. |
| 2016/0178961 | A1* | 6/2016 | No .................... G02F 1/133514 349/106 |

FOREIGN PATENT DOCUMENTS

| CN | 1388403 A | 1/2003 |
| CN | 102789088 A | 11/2012 |
| CN | 102902110 A | 1/2013 |
| CN | 103869555 A | 6/2014 |
| CN | 104238207 A | 12/2014 |
| JP | 2001290166 A | 10/2001 |
| JP | 2007133280 A | 5/2007 |

* cited by examiner

*Primary Examiner* — Charles S Chang
(74) *Attorney, Agent, or Firm* — Mark M. Friedman

(57) ABSTRACT

The present invention provides a display panel, including data line wiring regions and pixel regions which are adjacent with one another. A data line is disposed in the data line wiring regions, a data line black matrix less (DBS) common electrode is located on the data line, a pixel electrode is disposed in the pixel regions on a same layer as the DBS common electrode, and an interval region is defined between the DBS common electrode and the pixel electrode. At least one of a side of the DBS common electrode close to the interval region and a side of the pixel electrode close to the interval region comprise a gradual changing protruding structure toward the interval region.

19 Claims, 7 Drawing Sheets

DISPLAY PANEL

FIELD OF INVENTION

The present disclosure relates to the field of display technology, and more particularly, to a display panel.

BACKGROUND OF INVENTION

Liquid crystal displays (LCDs) have many advantages such as thin body, power saving, no radiation, etc., and have been widely used and occupy a leading position in flat display field. A working principle of liquid crystal display panels is to fill liquid crystal molecules between a thin film transistor (TFT) array substrate and a color filter (CF) substrate, and apply a driving voltage to the two substrates to control rotation direction of the liquid crystal molecules to refract light of backlight modules to produce images.

For vertical alignment (VA) type liquid crystal display panels, high-quality vertical alignment (HVA) technology is generally adopted to perform alignment. This technology mainly incorporates a polymerizable monomer in a liquid crystal layer, applies voltage to both sides of the liquid crystal layer during alignment (high voltage waveform signal is applied to a color filter (CF) common electrode, and a pixel electrode is grounded) to cause liquid crystals to produce a predetermined angle deviation, and irradiates the liquid crystals with ultraviolet (UV) light to form a fixed pretilt angle.

Traditional liquid crystal display panels need a black matrix (BM) disposed on one side of a color film substrate to shield light. When applied to a curved liquid crystal display panel, bending the panel will shift a position of the BM and cause light leakage and color shift. In order to solve the problem, a design of data line BM less (DBS) which reduces the BM on a data line is used; that is, a DBS electrode at a same layer as a pixel electrode is disposed on the data line of an array substrate, and there is no voltage difference between the DBS electrode and the CF common electrode of the color film substrate, so that the liquid crystals between the DBS electrode and the CF common electrode do not rotate and retain a black state to replace the black matrix in shielding light.

When aligning the liquid crystal display panel by using HVA alignment technology and DBS technology, since there is no voltage difference between the DBS electrode and the CF common electrode, and the pixel electrode is grounded, the voltage difference between the DBS electrode and the pixel electrode is greater. Therefore, the liquid crystals corresponding to an interval region between the DBS electrode and the pixel electrode pretilt in a direction perpendicular to the DBS electrode; that is, an azimuth angle tends to be 0°. However, when the azimuth angle of the liquid crystal molecules is 0°, the liquid crystals have low efficiency, which will increase a width of dark textures on both sides of a data line (that is, on both sides of the DBS common electrode), thereby affecting transmittance of the liquid crystal display panel.

SUMMARY OF INVENTION

The present disclosure provides a display panel which can improve convergence of liquid crystal alignment dark textures in an interval region, and reduce dark textures width of boundaries of the DBS common electrode, thereby increasing transmittance of the display panel.

In a first aspect, the present disclosure provides a display panel comprising data line wiring regions and pixel regions which are adjacent with one another, a data line disposed in the data line wiring regions, a data line black matrix less (DBS) common electrode located on the data line, a pixel electrode disposed in the pixel regions on a same layer as the DBS common electrode, and an interval region is defined between the DBS common electrode and the pixel electrode. At least one of a side of the DBS common electrode close to the interval region and a side of the pixel electrode close to the interval region comprise a gradual changing protruding structure toward the interval region.

In the display panel provided by the present disclosure, the data line extends along a first direction, the side of the pixel electrode close to the interval region is parallel to the first direction, and the side of the DBS common electrode close to the interval region comprises the protruding structure.

In the display panel provided by the present disclosure, the data line extends along the first direction, the side of the DBS common electrode close to the interval region is parallel to the first direction, and the side of the pixel electrode close to the interval region comprises the protruding structure.

In the display panel provided by the present disclosure, a length of the protruding structure along a first direction is gradually decreased along a direction toward the interval region.

In the display panel provided by the present disclosure, a projection of the protruding structure along a direction perpendicular to the display panel is a right triangle, and a projection of a side of the protruding structure close to the interval region along the direction perpendicular to the display panel is a hypotenuse of the right triangle.

In the display panel provided by the present disclosure, an included angle between the hypotenuse and the first direction is greater than 0° and less than or equal to 4°.

In the display panel provided by the present disclosure, a projection of the protruding structure along a direction perpendicular to the display panel is an obtuse triangle, and a projection of a side of the protruding structure close to the interval region along the direction perpendicular to the display panel comprises a first side and a second side which are adjacent with one another, and the first side and the second side are correspondingly two short sides of the obtuse triangle.

In the display panel provided by the present disclosure, an included angle between the first side and the second side and the first direction is greater than 0° and less than or equal to 4°.

In the display panel provided by the present disclosure, a length of the first side is same as a length of the second side.

In the display panel provided by the present disclosure, the protruding structure is serrated in shape.

In the display panel provided by the present disclosure, the protruding structure comprises a plurality of serrated units which are sequentially adjacent along the first direction, a projection of each of the serrated units along a direction perpendicular to the display panel comprises a third side and a fourth side which are adjacent with one another, and an included angle between the third side and the fourth side and the first direction is greater than 0° and less than or equal to 4°.

In the display panel provided by the present disclosure, a length of the third side is same as a length of the fourth side.

In the display panel provided by the present disclosure, the data line extends along a first direction, the pixel electrode comprises a first trunk electrode and a second trunk electrode, the first trunk electrode is disposed close to the DBS common electrode, one terminal of the second trunk electrode is electrically connected to the first trunk electrode, and another terminal of the second trunk electrode extends in a second direction. The first direction and the second direction are perpendicular to each other, and the first trunk electrode is symmetrically arranged according to the second trunk electrode. At least one of a side of the DBS common electrode close to the interval region and a side of the first trunk electrode close to the interval region comprise the protruding structure, and the protruding structure is symmetrically arranged according to the second trunk electrode.

In the display panel provided by the present disclosure, the pixel electrode comprises a plurality of branch electrodes connecting to the first trunk electrode and the second trunk electrode.

In the display panel provided by the present disclosure, the display panel further comprises a color filter located between the data line and the DBS common electrode.

In the display panel provided by the present disclosure, the display panel further comprises a scanning line wiring region disposed to intersect the data line wiring regions, a scanning line disposed in the scanning line wiring region and intersecting and insulating with the data line, and a thin film transistor located on the scanning line. The thin film transistor is correspondingly electrically connected to the scanning line, the data line, and the pixel electrode. The thin film transistor, the scanning line, the data line, the color filter, the DBS common electrode, and the pixel electrode constitute an array substrate.

In the display panel provided by the present disclosure, the display panel further comprises an opposite substrate disposed opposite to the array substrate and a liquid crystal layer disposed between the array substrate and the opposite substrate.

In the display panel provided by the present disclosure, liquid crystal molecules in the liquid crystal layer corresponding to the interval region tend to pretilt at a 90° azimuth angle.

In the display panel provided by the present disclosure, a pixel structure of the display panel comprises any one of a 4-domain pixel structure or an 8-domain pixel structure.

In another aspect, the present disclosure further provides a display panel comprising data line wiring regions and pixel regions which are adjacent with one another, a data line disposed in the data line wiring regions, a pixel electrode disposed in the pixel regions on a same layer as the DBS common electrode, and an interval region is defined between the DBS common electrode and the pixel electrode. The data line extends along a first direction, a side of the pixel electrode close to the interval region is parallel to the first direction, a side of the DBS common electrode close to the interval region comprises a gradual changing protruding structure toward the interval region, and a length of the protruding structure along the first direction is gradually decreased along a direction toward the interval region.

Compared with the prior art, in the display panel provided by the present disclosure, at least one of a side of the DBS common electrode close to an interval region and a side of a pixel electrode close to the interval region comprise a gradual changing protruding structure toward the interval region, so that a side where the DBS common electrode and the pixel electrode are close to each other is a non-straight structure in the interval region; that is, the side of the DBS common electrode close to the interval region and the side of the pixel electrode close to the interval region form at least one similar included angle structure in the interval region. Since liquid crystal molecules will converge toward the included angle, when the liquid crystal layer in the display panel adopts HVA alignment, the liquid crystal molecules corresponding to the interval region will tend to pretilt at a 90° azimuth angle, which can relieve convergence of liquid crystal alignment dark texture in the interval region, and reduce dark textures width of the DBS common electrode, thereby increasing transmittance of the display panel.

DESCRIPTION OF DRAWINGS

The following detailed description of specific embodiments of the present disclosure will allow technical solutions and other beneficial effects of the present disclosure obvious in conjunction with accompanying drawings.

DETAILED DESCRIPTION OF PREFERRED EMBODIMENTS

Figure 1:
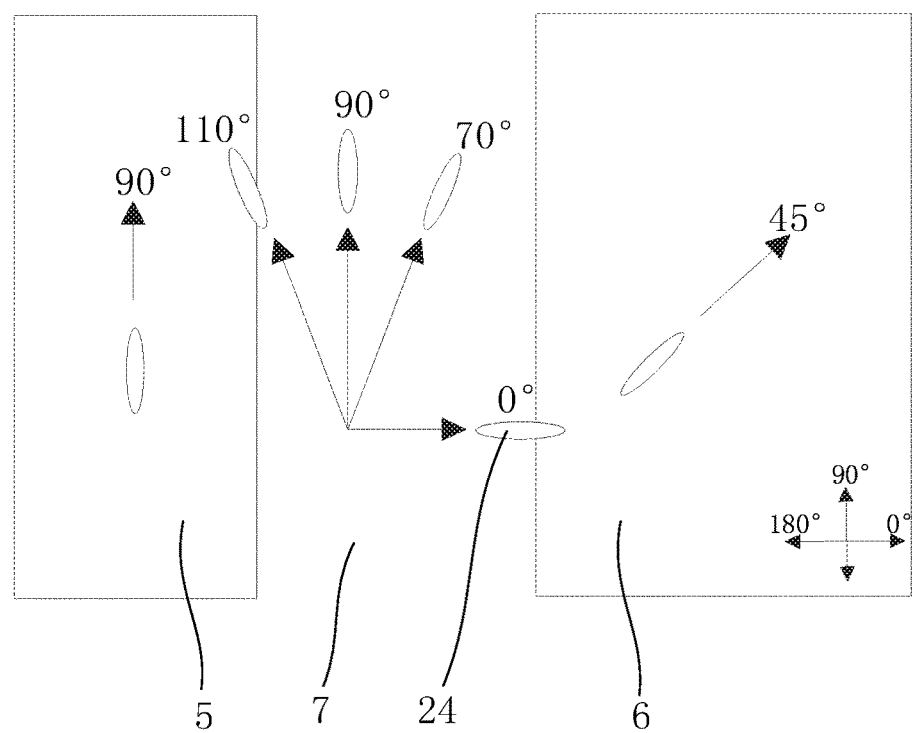
FIG. 1 is a schematic diagram of different azimuth angles of exemplary liquid crystal molecules.

The technical solutions in the embodiments of the present disclosure will be clearly and completely described below in conjunction with accompanying drawings in the embodiments of the present disclosure. Obviously, the embodiments described are merely a part of the present disclosure, rather than all the embodiments. All other embodiments obtained by the person having ordinary skill in the art based on embodiments of the disclosure, without making creative efforts, are within the scope of the present disclosure.

In descriptions of the present disclosure, it should be noted that, orientations or position relationships indicated by the terms, such as "center", "longitudinal", "transverse", "length", "width", "thickness", "upper", "lower", "front", "back", "left", "right", "vertical", "horizontal", "top", "bottom", "inside", "outside", "clockwise", "counterclockwise", etc. are based on the orientations or position relationships shown in the drawings. These are only convenience for describing the present disclosure and simplifying the descriptions, and does not indicate or imply that the device or element must have a specific orientation, a structure and an operation in the specific orientation, so it cannot be understood as a limitation on the present disclosure. In addition, the terms "first" and "second" are used for describing purposes only, and cannot be understood as indicating or implying relative importance or implicitly indicating the number of technical features indicated. Thus, the features defined as "first" and "second" may explicitly or implicitly include one or more of the features. In the descriptions of the present disclosure, the meaning of "plurality" is two or more, unless it is specifically defined otherwise.

In the present disclosure, the terms "mounting", "connected", "fixed" and the like should be broadly understood unless expressly stated or limited otherwise. For example, it may be fixed connected, removably connected, or integrated; it may be mechanically connected, or an electrically connected; it may be directly connected, or indirectly connected through an intermediary; it may be a connection between two elements or an interaction between two elements. For those skilled in the art, the specific meanings of the above terms in the present disclosure may be understood based on specific situations.

In the present disclosure, unless explicitly stated and defined otherwise, the first feature may be "above" or "below" the second feature and may include direct contact between the first and second features. It may also include that the first and second features are not in direct contact but are contacted by another feature between them. Moreover, the first feature is "above" the second feature, including the first feature directly above and obliquely above the second feature, or merely indicates that the first feature is higher in level than the second feature. The first feature is "below" the second feature, including the first feature is directly below and obliquely below the second feature, or only indicates that the first feature is less horizontal than the second feature.

The following disclosure provides many different embodiments or examples for achieving different structures of the present disclosure. To simplify the present disclosure, components and settings of specific examples are described below. They are only examples and are not intended to limit the present disclosure. In addition, the present disclosure may repeat reference numbers and/or reference letters in different examples, this repetition is for the purpose of simplicity and clarity, and does not itself indicate the relationship between various embodiments and/or settings discussed. In addition, the present disclosure provides examples of various specific processes and materials, but those of ordinary skill in the art may be aware of the present disclosure of other processes and/or the use of other materials.

For vertical alignment (VA) type liquid crystal display panels, an alignment process is an extremely critical step which directly affects optical quality, manufacturing process, or adjustable margin of the display panel. In general, a high-voltage waveform signal is applied to a color filter (CF) common electrode (or a common electrode on an opposite substrate disposed opposite to an array substrate) and a data line black matrix less (DBS) common electrode, and a pixel electrode is grounded. Therefore, an electric field in a predetermined direction is formed between an upper electrode plate and a lower electrode plate, so that after liquid crystal molecules are oriented to fall, they are irradiated with ultraviolet (UV) light and are cured to form a pretilt angle, thereby achieving purposes of eliminating dark textures to improve transmittance and improve or adjust corresponding time. However, since there is no voltage difference between the DBS common electrode and the CF common electrode, or the voltage difference is small (less than turn-on threshold voltage of the liquid crystal); that is, there is a greater voltage difference between the DBS common electrode and the pixel electrode during high-quality vertical alignment (HVA), the liquid crystal molecules corresponding to an interval region between the DBS common electrode and the pixel electrode are allowed to pretilt along a direction perpendicular to a data line, namely an azimuth angle is 0°. Thus, liquid crystal efficiency in the interval region between the DBS common electrode and the pixel electrode is lower and easily fluctuates and loses transmittance.

Specifically, the azimuth angle of the liquid crystal molecules can be understood as an included angle between a projection of a long axis of the liquid crystal molecules along a direction perpendicular to the display panel and a direction perpendicular to the data line. As shown in FIG. 1, when the azimuth angle of the liquid crystal molecules is 0°, the long axis projection of the liquid crystal molecules is perpendicular to an extending direction of the DBS common electrode (or the data line); when the azimuth angle of the liquid crystal molecules is 90°, the long axis projection of the liquid crystal molecules is parallel to the extension direction of the DBS common electrode.

TABLE 1

| | Tr | | |
| --- | --- | --- | --- |
| | | α | |
| β | 0.7° | 0.9° | 1.2° |
| 0° | 9.09% | 9.51% | 10.02% |
| 70° | 9.52% | 10.03% | 10.67% |
| 90° | 9.56% | 10.09% | 10.74% |
| 110° | 9.55% | 10.08% | 10.73% |

Table 1 is transmittance Tr of the interval region under different pretilt angles α and azimuth angle β of the interval region obtained through simulation. It can be seen that in Table 1, when the pretilt angle α of the liquid crystal molecules is 0.7°, 0.9°, or 1.2° and the azimuth angle β of the liquid crystal molecules in the interval region is 0°, transmittance Tr is the smallest; and while the azimuth angle β increases from 0° to 90°, transmittance Tr gradually increases. Therefore, transmittance of the interval region can be increased by adjusting the azimuth angle of the liquid crystal molecules corresponding to the interval region, thereby reducing a width of the dark textures on both sides of the DBS common electrode.

Figure 2:
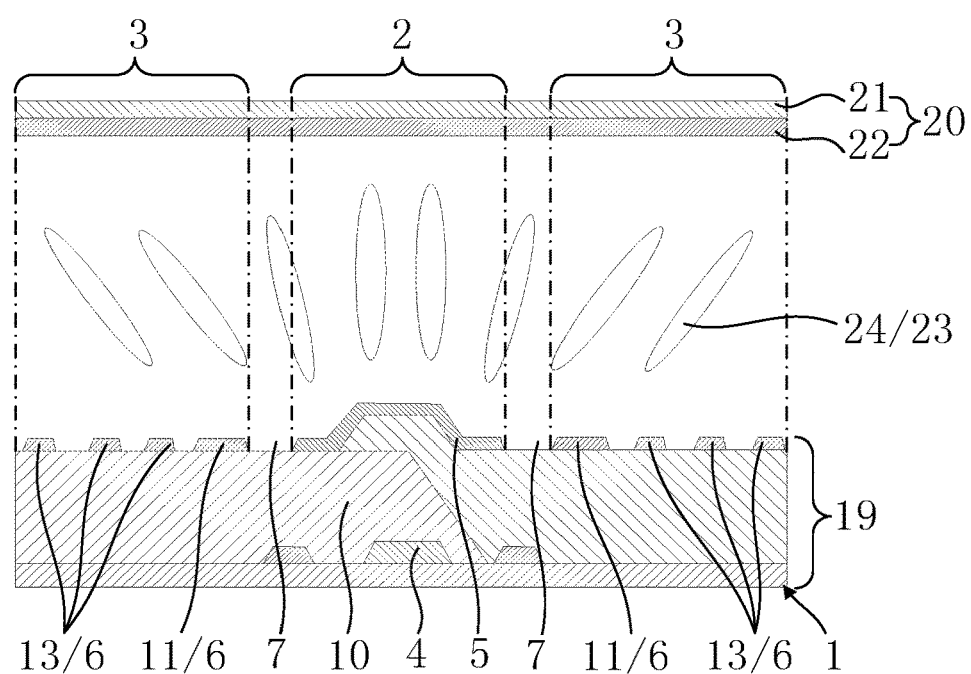
FIG. 2 is a schematic diagram of a partial cross-sectional structure of a display panel provided by an embodiment of the present disclosure.
Figure 3:
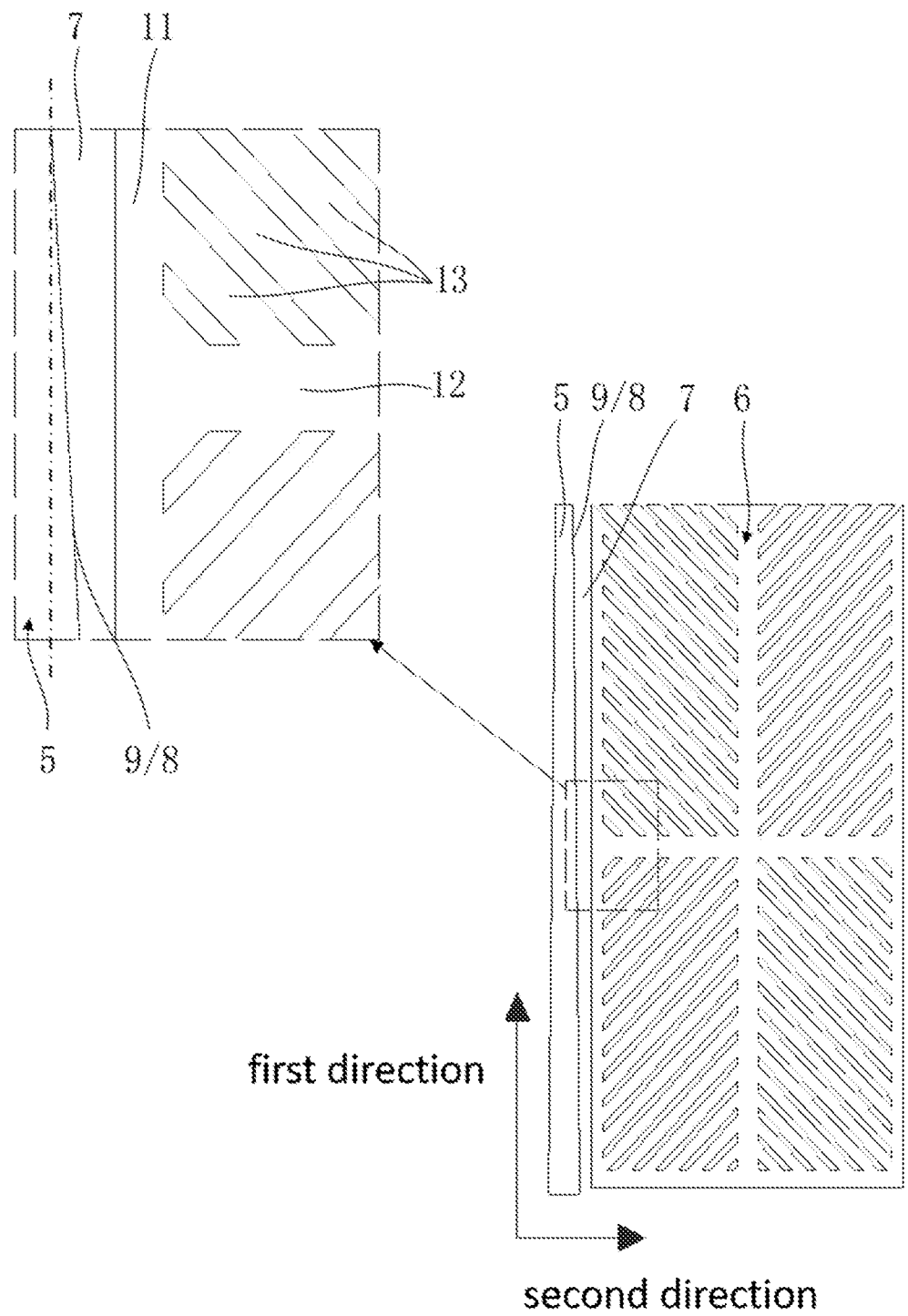
FIG. 3 is a schematic structure diagram of a data line black matrix less (DBS) common electrode and a pixel electrode provided by the embodiment of the present disclosure.
Figure 4:
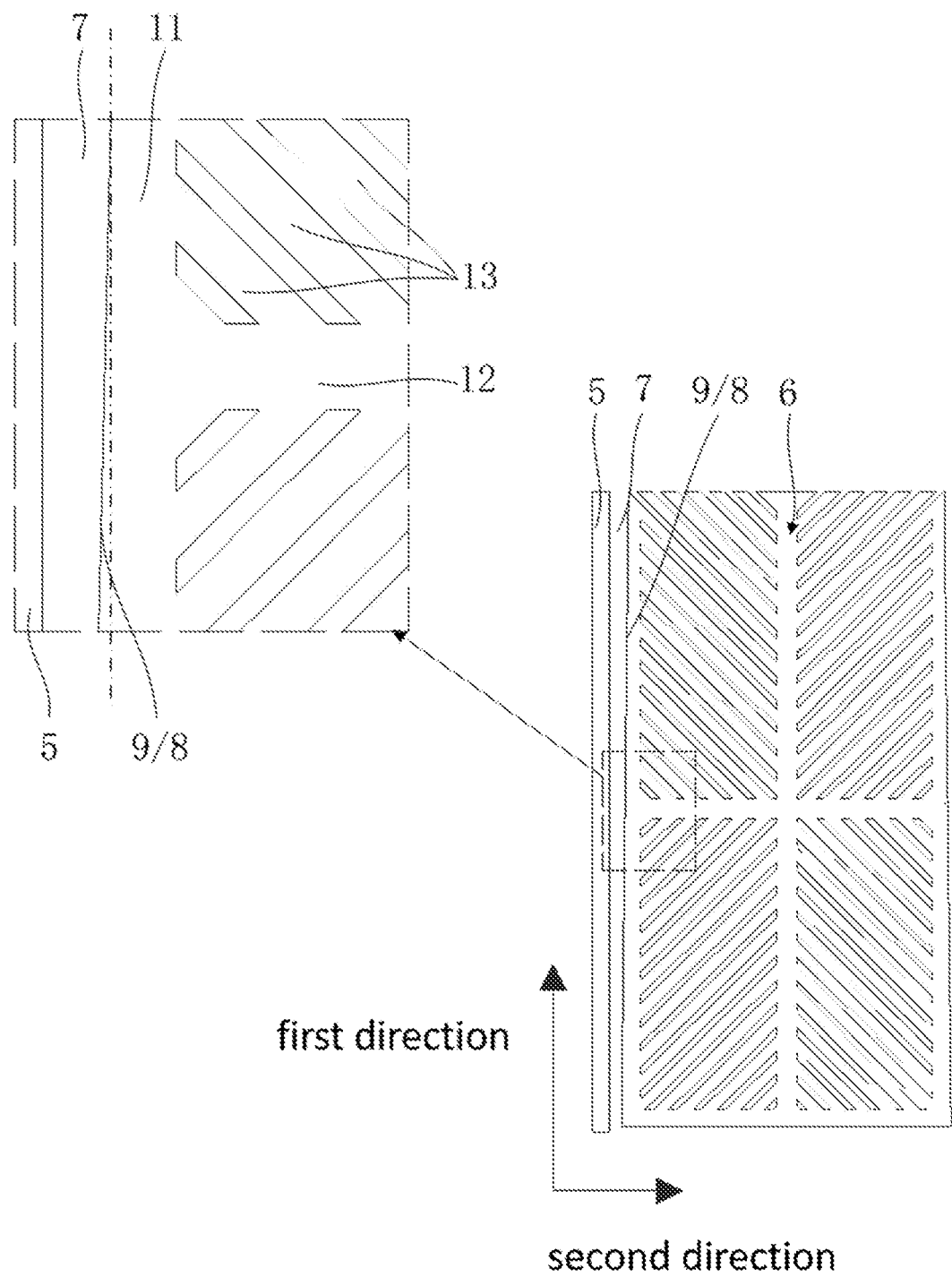
FIG. 4 is another schematic structural diagram of the data line black matrix less (DBS) common electrode and the pixel electrode provided by the embodiment of the present disclosure.

As shown in FIG. 2 to FIG. 4, an embodiment of the present disclosure provides a display panel 1. The display panel 1 comprises a plurality of data line wiring regions 2 and a plurality of pixel regions 3, wherein one data line wiring region 2 is disposed between any two adjacent pixel regions 3, and one pixel region 3 is disposed between any two adjacent data line wiring regions 2. For any adjacent data line wiring regions 2 and pixel regions 3, a data line 4 is disposed in the data line wiring regions 2 and a data line black matrix less (DBS) common electrode 5 is located on the data line 4, a pixel electrode 6 is disposed in the pixel regions 3 on a same layer as the DBS common electrode 5, and an interval region 7 is defined between the DBS common electrode 5 and the pixel electrode 6. At least one of a side of the DBS common electrode 5 close to the interval region 7 and a side of the pixel electrode 6 close to the interval region 7 comprise a gradual changing protruding structure 8 toward the interval region 7.

It should be noted that the embodiment of the present disclosure only uses one data line wiring region 2 and one pixel region 3 adjacent to the data line wiring region 2 as examples. It can be understood that the DBS common electrode 5 and the pixel electrode 6 adjacent to the DBS common electrode 5 of any data line wiring region 2 are all within a protection scope of the present disclosure. The embodiment of the present disclosure describes only one side of the DBS common electrode 5 and one side of the pixel electrode 6 adjacent thereof. In fact, the protruding structure 8 may be disposed on both sides of the DBS common electrode 5 or the pixel electrode 6.

Specifically, the data line 4 extends along a first direction (the first direction in the present embodiment is a vertical direction). As shown in FIG. 3, the side of the pixel electrode 6 close to the interval region 7 is parallel to the first direction, and the side of the DBS common electrode 5 close to the interval region 7 comprises the protruding structure 8. Furthermore, the side of the DBS common electrode 5 close to the interval region 7 is parallel to the first direction, and the side of the pixel electrode 6 close to the interval region 7 comprises the protruding structure 8.

Therefore, both the side of the pixel electrode 6 close to the interval region 7 and the side of the DBS common electrode 5 close to the interval region 7 may comprise the protruding structure 8. Furthermore, the pixel electrode 6 is divided into a first segment and a second segment which are adjacent with one another along the first direction, a side of the first segment of the pixel electrode 6 close to the interval region 7 comprises the protruding structure 8, and a side of the second segment of the pixel electrode 6 close to the interval region 7 is parallel to the first direction; in addition, a side of the DBS common electrode 5 corresponding to the first segment of the pixel electrode 6 close to the interval region 7 is parallel to the first direction, and a side of the DBS common electrode 5 corresponding to the second segment of the pixel electrode 6 close to the interval region 7 comprises the protruding structure 8. The above situations can allow the pixel electrode 6 close to the interval region 7 and the DBS common electrode 5 close to the interval region 7 to be a non-straight structure.

It should be noted that a straight type herein refers to the side of the pixel electrode 6 close to the interval region 7 and the side of the DBS common electrode 5 close to the interval region 7 which are parallel to the first direction; that is, the side of the pixel electrode 6 close to the interval region 7 and the side of the DBS common electrode 5 close to the interval region 7 are parallel to each other.

Specifically, a length of the protruding structure 8 along the first direction is gradually decreased along a direction toward the interval region 7.

Specifically, a projection of the protruding structure 8 along a direction perpendicular to the display panel 1 is a right triangle, a projection of a side of the protruding structure 8 close to the interval region 7 along the direction perpendicular to the display panel 1 is a hypotenuse 9 of the right triangle, and an included angle between the hypotenuse 9 and the first direction is greater than 0° and less than or equal to 4°.

Specifically, the display panel 1 further comprises a color filter 10, and the color filter 10 is located between the data line 4 and the DBS common electrode 5; that is, the display panel 1 provided by the present embodiment is a color filter 10 on array (COA) type display panel, and the embodiment of the present disclosure is not limited to the COA type liquid crystal display panel.

Specifically, the display panel 1 further comprises a scanning line wiring region disposed to intersect the data line wiring regions 2, a scanning line disposed in the scanning line wiring region and intersecting and insulating the data line 4, and a thin film transistor located on the scanning line. The thin film transistor is respectively electrically connected to the scanning line, the data line 4, and the pixel electrode 6. The thin film transistor, the scanning line, the data line 4, the color filter 10, the DBS common electrode 5, and the pixel electrode 6 constitute an array substrate 19. The display panel 1 further comprises an opposite substrate 20 disposed opposite to the array substrate 19 and a liquid crystal layer 23 disposed between the array substrate 19 and the opposite substrate 20. The opposite substrate 20 comprises a base substrate 21 and a common electrode located at a side of base substrate 21 close to the liquid crystal layer 23. In HVA alignment process, a high-voltage waveform signal is applied to the common electrode 22 of the opposite substrate 20 and the DBS common electrode 5 of the array substrate 19, and the pixel electrode 6 is grounded. Therefore, an electric field in a predetermined direction is formed between the array substrate 19 and the opposite substrate 20, so that the liquid crystal molecules 24 of the liquid crystal layer 23 are oriented to fall.

In one embodiment, the pixel electrode 6 comprises a first trunk electrode 11 and a second trunk electrode 12, the first trunk electrode 11 is disposed close to the DBS common electrode 5, one terminal of the second trunk electrode 12 is electrically connected to the first trunk electrode 11, and another terminal of the second trunk electrode 12 extends in a second direction. The first direction and the second direction are perpendicular to each other, and the first trunk electrode 11 is symmetrically arranged according to the second trunk electrode 12. At least one of a side of the DBS common electrode 5 close to the interval region 7 and a side of the first trunk electrode 11 close to the interval region 7 comprise the protruding structure 8, and the protruding structure is symmetrically arranged according to the second trunk electrode. Moreover, the pixel electrode 6 further comprises a plurality of branch electrodes 13 connecting to the first trunk electrode 11 and the second trunk electrode 12.

Specifically, a pixel structure of the display panel 1 comprises any one of a 4-domain pixel structure or an 8-domain pixel structure, but it is not limited herein.

In the present embodiment, at least one of a side of the DBS common electrode 5 close to the interval region 7 and a side of the pixel electrode 6 close to the interval region 7 comprise a gradual changing protruding structure 8 toward the interval region 7, so that a side where the DBS common electrode 5 and the pixel electrode 6 are close to each other is a non-straight structure in the interval region 7; that is, the side of the DBS common electrode 5 close to the interval region 7 and the side of the pixel electrode 6 close to the interval region 7 form a similar included angle structure in the interval region 7 (that is, an extension line of any segments of the DBS common electrode 5 close to the interval region 7 intersects an extension line of the corresponding pixel electrode 6 close to the interval region 7). Since liquid crystal molecules will converge toward the included angle, when the liquid crystal layer in the display panel 1 adopts HVA alignment, the liquid crystal molecules corresponding to the interval region 7 will tend to pretilt at a 90° azimuth angle, which can relieve convergence of liquid crystal alignment dark textures in the interval region 7, and reduce dark textures width of the DBS common electrode 5, thereby increasing transmittance of the display panel 1.

It should be noted that the liquid crystal molecules corresponding to the interval region 7 tend to pretilt at a 90° azimuth angle, and the tendency to pretilt at a 90° azimuth angle described herein is that the azimuth angle of the liquid crystal molecules increases gradually from 0° to 90°, or the azimuth angle of the liquid crystal molecules is close to 90° (including less than 90° and greater than 90°). Moreover, the azimuth angle of the liquid crystal molecules can also be 90°, and it is not limited herein.

Figure 5:
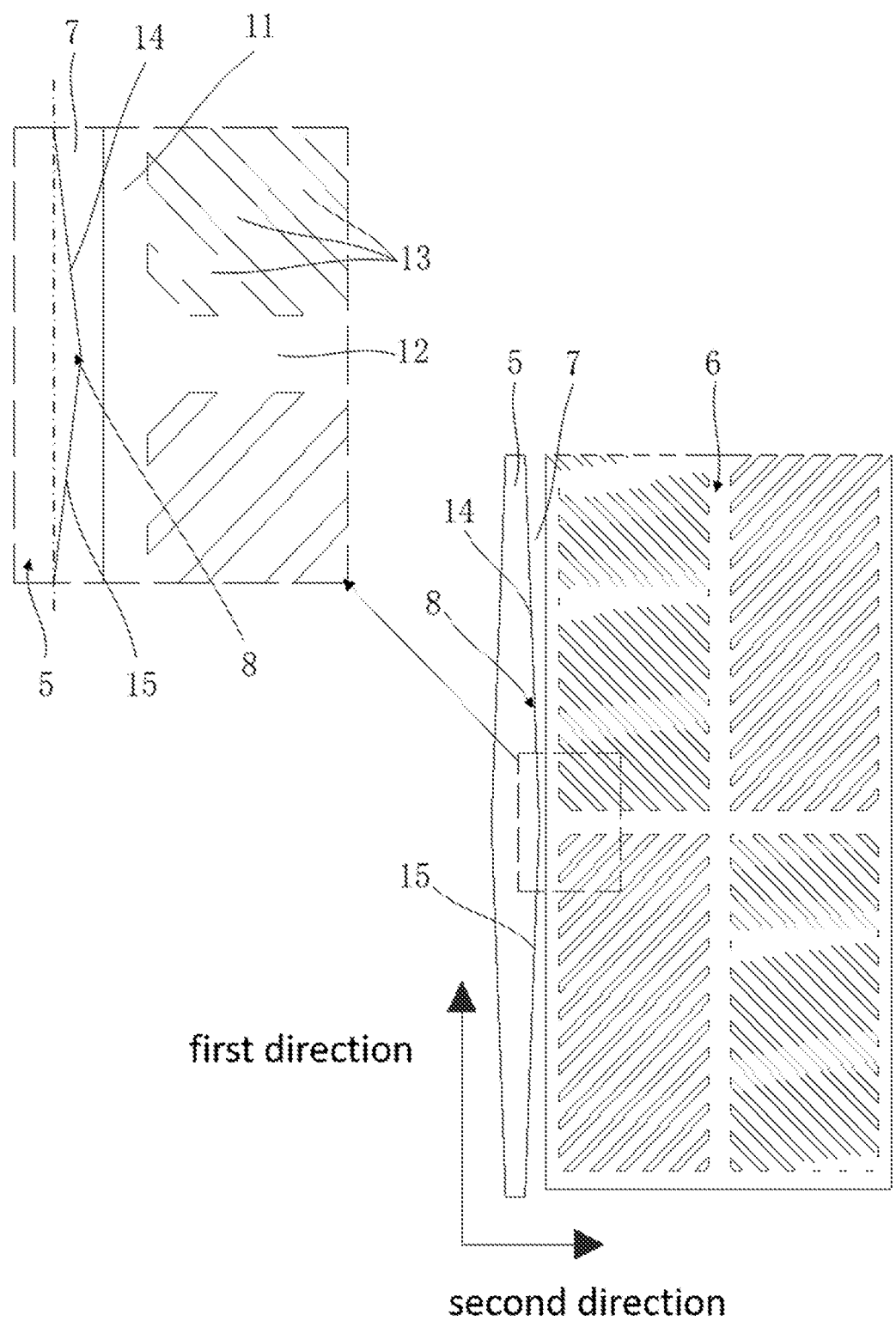
FIG. 5 is yet another schematic structural diagram of the data line black matrix less (DBS) common electrode and the pixel electrode provided by the embodiment of the present disclosure.
Figure 6:
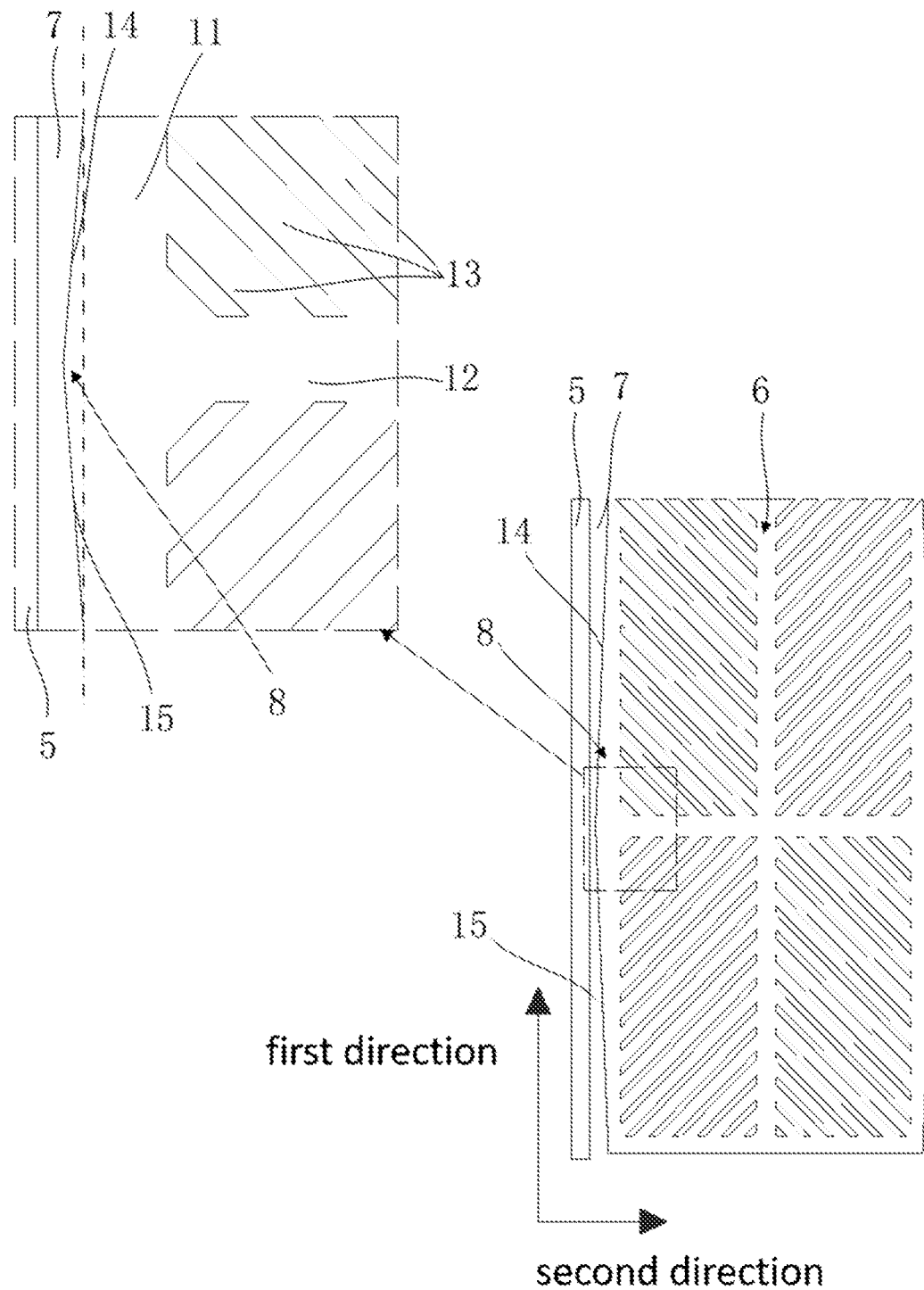
FIG. 6 is yet another schematic structural diagram of the data line black matrix less (DBS) common electrode and the pixel electrode provided by the embodiment of the present disclosure.

As shown in FIG. 5 and FIG. 6, the embodiment of the present disclosure further provides a display panel 1. The difference from the above embodiment is that a projection of the protruding structure 8 along a direction perpendicular to the display panel 1 is an obtuse triangle, and a projection of a side of the protruding structure 8 close to the interval region 7 along the direction perpendicular to the display panel 1 comprises a first side 14 and a second side 15 which are adjacent with one another, and the first side 14 and the second side 15 are correspondingly two short sides of the obtuse triangle.

Specifically, an included angle between the first side 14 and the second side 15 and the first direction is greater than 0° and less than or equal to 4°.

Specifically, the protruding structure 8 is symmetrically arranged according to the second trunk electrode 12; that is, a length of the first side 14 is same as a length of the second side 15, and the above obtuse triangle is an isosceles triangle.

Specifically, as shown in FIG. 5, the side of the first trunk electrode 11 of the pixel electrode 6 close to the interval region 7 is parallel to the first direction, and the side of the DBS common electrode 5 close to the interval region 7 comprises the protruding structure 8. Furthermore, as shown in FIG. 6, the side of the DBS common electrode 5 close to the interval region 7 is parallel to the first direction, and the side of the first trunk electrode 11 of the pixel electrode 6 close to the interval region 7 comprises the protruding structure 8.

In the present embodiment, at least one of a side of the DBS common electrode 5 close to the interval region 7 and a side of the pixel electrode 6 close to the interval region 7 comprise a gradual changing protruding structure 8 toward the interval region 7, so that the side where the DBS common electrode 5 and the pixel electrode 6 are close to each other is a non-straight structure in the interval region 7; that is, the side of the DBS common electrode 5 close to the interval region 7 and the side of the pixel electrode 6 close to the interval region 7 form two similar included angle structures in the interval region 7. Since liquid crystal molecules will converge toward the included angle, when the liquid crystal layer in the display panel 1 adopts HVA alignment, the liquid crystal molecules corresponding to the interval region 7 will tend to pretilt at a 90° azimuth angle, which can relieve convergence of liquid crystal alignment dark textures in the interval region 7, and reduce dark textures width of the DBS common electrode 5, thereby increasing transmittance of the display panel 1. In addition, in the embodiment of the present disclosure, the side of the DBS common electrode 5 close to the interval region 7 and the side of the pixel electrode 6 close to the interval region 7 form two similar included angle structures in the interval region 7 to be a symmetrical structure, and the liquid crystal molecules corresponding to the two similar included angle structures are a variety of pretilts, which is beneficial for relieving color shift.

Figure 7:
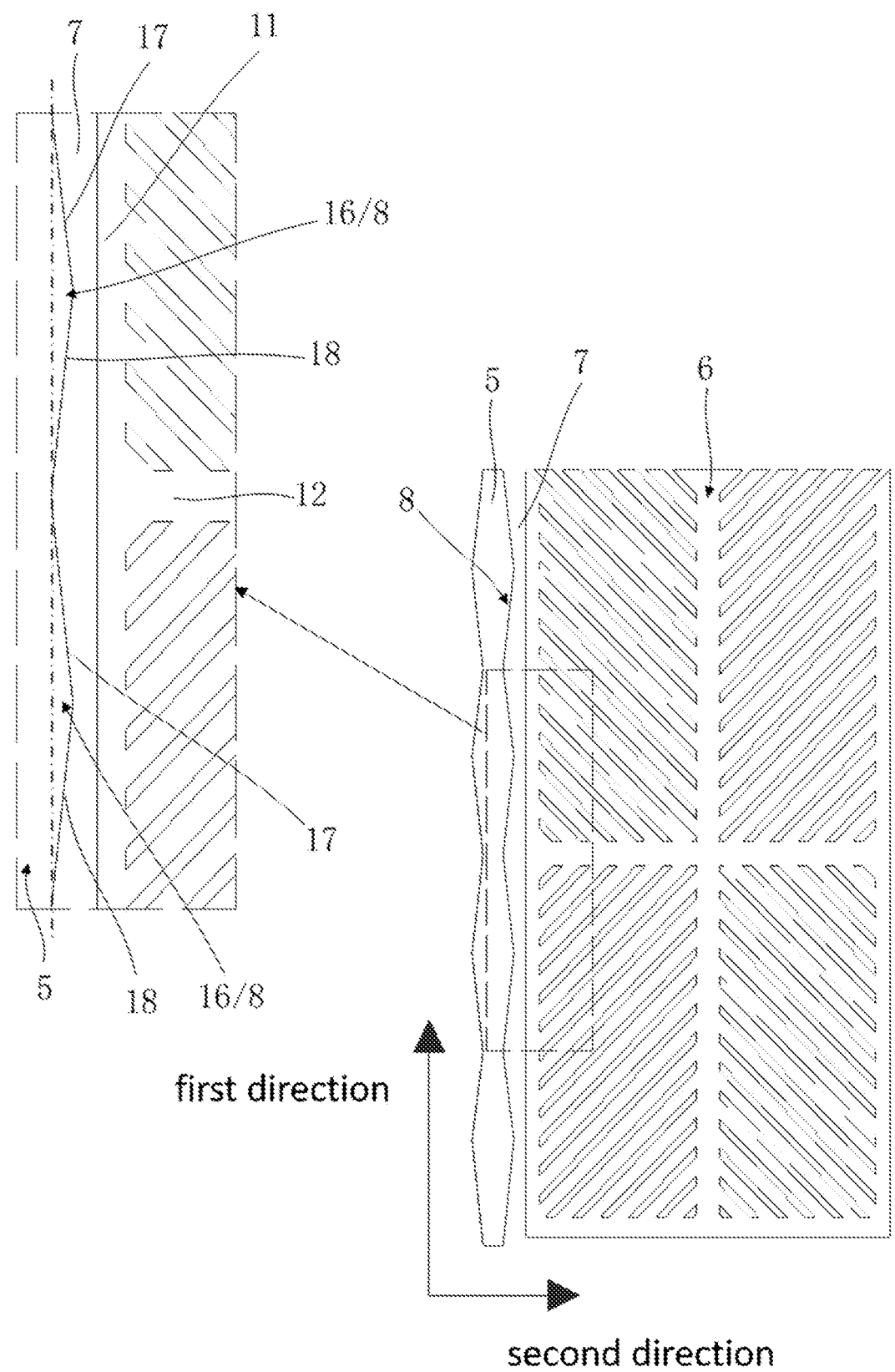
FIG. 7 is yet another schematic structural diagram of the data line black matrix less (DBS) common electrode and the pixel electrode provided by the embodiment of the present disclosure.
Figure 8:
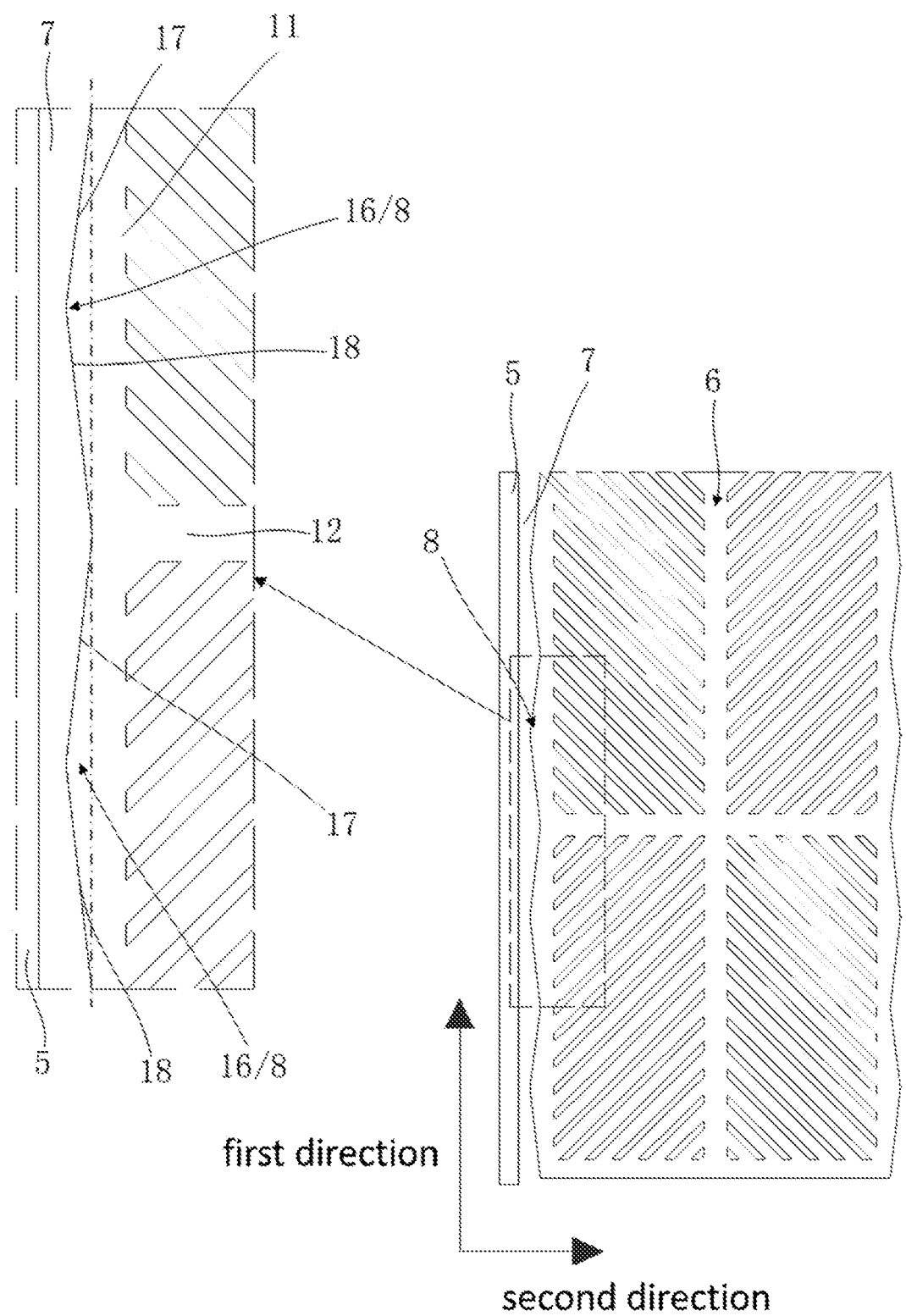
FIG. 8 is yet another schematic structural diagram of the data line black matrix less (DBS) common electrode and the pixel electrode provided by the embodiment of the present disclosure.

As shown in FIG. 7 and FIG. 8, the embodiment of the present disclosure further provides a display panel 1. The difference from the above embodiment is that the protruding structure 8 is serrated in shape.

Specifically, the protruding structure 8 comprises a plurality of serrated units 16 which are sequentially adjacent along the first direction, a projection of each of the serrated units 16 along a direction perpendicular to the display panel 1 comprises a third side 17 and a fourth side 18 which are adjacent with one another, and an included angle between the third side 17 and the fourth side 18 and the first direction is greater than 0° and less than or equal to 4°.

Specifically, the serrated protruding structure 8 is symmetrically arranged according to the second trunk electrode 12, and a length of the third side 17 is same as a length of the fourth side 18; that is, the projection of each serrated units 16 along the direction perpendicular to the display panel 1 is an isosceles triangle.

Specifically, as shown in FIG. 7, as shown in FIG. 5, the side of the first trunk electrode 11 of the pixel electrode 6 close to the interval region 7 is parallel to the first direction, and the side of the DBS common electrode 5 close to the interval region 7 comprises the protruding structure 8. Furthermore, as shown in FIG. 8, the side of the DBS common electrode 5 close to the interval region 7 is parallel to the first direction, and the side of the first trunk electrode 11 of the pixel electrode 6 close to the interval region 7 comprises the protruding structure 8.

In the present embodiment, at least one of a side of the DBS common electrode 5 close to the interval region 7 and a side of the pixel electrode 6 close to the interval region 7 comprise a gradual changing protruding structure 8 toward the interval region 7, so that the side where the DBS common electrode 5 and the pixel electrode 6 are close to each other is a non-straight structure in the interval region 7; that is, the side of the DBS common electrode 5 close to the interval region 7 and the side of the pixel electrode 6 close to the interval region 7 form a plurality of similar included angle structures in the interval region 7. Since liquid crystal molecules will converge toward the included angle, when the liquid crystal layer in the display panel 1 adopts HVA alignment, the liquid crystal molecules corresponding to the interval region 7 will tend to pretilt at a 90° azimuth angle, which can relieve convergence of liquid crystal alignment dark textures in the interval region 7, and reduce dark textures width of the DBS common electrode 5, thereby increasing transmittance of the display panel 1.

In the above embodiments, description of each embodiments has its own emphasis. For a part that is not described in detail in an embodiment, refer to description of other embodiments.

A display panel provided by the embodiments of the present disclosure has been described in detail above. The present disclosure uses specific examples to describe principles and embodiments of the present disclosure. The descriptions of the above embodiments are only used to help understand technical solutions of the present disclosure and core ideas thereof. Moreover, those of ordinary skill in the art should understand that the technical solutions described in the aforesaid embodiments can still be modified, or have some technical features equivalently replaced. However, these modifications or replacements do not depart from a scope of the technical solutions of the embodiments of the present disclosure.

What is claimed is:

1. A display panel, comprising:
    data line wiring regions and pixel regions which are adjacent with one another;
    a data line disposed in the data line wiring regions and extends along a first direction;
    a data line black matrix less (DBS) common electrode located on the data line;
    a pixel electrode disposed in the pixel regions on a same layer as the DBS common electrode; and
    an interval region defined between the DBS common electrode and the pixel electrode;
    wherein at least one of a side of the DBS common electrode close to the interval region and a side of the pixel electrode close to the interval region comprise a gradual changing protruding structure toward the interval region; and
    an included angle between a hypotenuse of the protruding structure and the first direction is greater than 0° and less than or equal to 4°.

2. The display panel as claimed in claim 1, wherein the side of the pixel electrode close to the interval region is parallel to the first direction, and the side of the DBS common electrode close to the interval region comprises the protruding structure.

3. The display panel as claimed in claim 1, wherein the side of the DBS common electrode close to the interval region is parallel to the first direction, and the side of the pixel electrode close to the interval region comprises the protruding structure.

4. The display panel as claimed in claim 1, wherein a length of the protruding structure along the first direction is gradually decreased along a direction toward the interval region.

5. The display panel as claimed in claim 4, wherein a projection of the protruding structure along a direction perpendicular to the display panel is a right triangle, and a projection of a side of the protruding structure close to the interval region along the direction perpendicular to the display panel is a hypotenuse of the right triangle.

6. The display panel as claimed in claim 4, wherein the protruding structure is serrated in shape.

7. The display panel as claimed in claim 4, wherein a projection of the protruding structure along a direction perpendicular to the display panel is an obtuse triangle, and a projection of a side of the protruding structure close to the interval region along the direction perpendicular to the display panel comprises a first side and a second side which are adjacent with one another, and the first side and the second side are correspondingly two short sides of the obtuse triangle.

8. The display panel as claimed in claim 7, wherein included angles between the first side and the first direction and between the second side and the first direction are greater than 0° and less than or equal to 4°.

9. The display panel as claimed in claim 7, wherein a length of the first side is same as a length of the second side.

10. The display panel as claimed in claim 7, wherein the protruding structure comprises a plurality of serrated units which are sequentially adjacent along the first direction, a projection of each of the serrated units along a direction perpendicular to the display panel comprises a third side and a fourth side which are adjacent with one another, and an included angle between the third side and the fourth side and the first direction is greater than 0° and less than or equal to 4°.

11. The display panel as claimed in claim 10, wherein a length of the third side is same as a length of the fourth side.

12. The display panel as claimed in claim 1, wherein the pixel electrode comprises a first trunk electrode and a second trunk electrode, the first trunk electrode is disposed close to the DBS common electrode, one terminal of the second trunk electrode is electrically connected to the first trunk electrode, and another terminal of the second trunk electrode extends in a second direction;
    the first direction and the second direction are perpendicular to each other, and the first trunk electrode is symmetrically arranged according to the second trunk electrode; and
    the at least one of a side of the DBS common electrode close to the interval region and a side of the first trunk electrode close to the interval region comprise the protruding structure, and the protruding structure is symmetrically arranged according to the second trunk electrode.

13. The display panel as claimed in claim 12, wherein the pixel electrode comprises a plurality of branch electrodes connecting to the first trunk electrode and the second trunk electrode.

14. The display panel as claimed in claim 1, wherein the display panel further comprises a color filter located between the data line and the DBS common electrode.

15. The display panel as claimed in claim 14, wherein the display panel further comprises:
    a scanning line wiring region disposed to intersect the data line wiring regions;
    a scanning line disposed in the scanning line wiring region and intersecting and insulating the data line; and
    a thin film transistor located on the scanning line;
    wherein the thin film transistor is correspondingly electrically connected to the scanning line, the data line, and the pixel electrode; and
    the thin film transistor, the scanning line, the data line, the color filter, the DBS common electrode, and the pixel electrode constitute an array substrate.

16. The display panel as claimed in claim 15, wherein the display panel further comprises an opposite substrate disposed opposite to the array substrate and a liquid crystal layer disposed between the array substrate and the opposite substrate.

17. The display panel as claimed in claim 16, wherein liquid crystal molecules in the liquid crystal layer corresponding to the interval region tend to pretilt at a 90° azimuth angle.

18. The display panel as claimed in claim 1, wherein a pixel structure of the display panel comprises a 4-domain pixel structure or an 8-domain pixel structure.

19. A display panel, comprising:
    data line wiring regions and pixel regions which are adjacent with one another;
    a data line disposed in the data line wiring regions;
    a data line black matrix less (DBS) common electrode located on the data line;
    a pixel electrode disposed in the pixel regions on a same layer as the DBS common electrode; and
    an interval region defined between the DBS common electrode and the pixel electrode;
    wherein the data line extends along a first direction, a side of the pixel electrode close to the interval region is parallel to the first direction, a side of the DBS common electrode close to the interval region comprises a gradual changing protruding structure toward the interval region, and a length of the protruding structure along the first direction is gradually decreased along a direction toward the interval region; and an included angle between a hypotenuse of the protruding structure and the first direction is greater than 0° and less than or equal to 4°.

* * * * *